Aug. 22, 1939.   W. E. S. STRONG   2,170,165
COMPOSITE BUILDING UNIT
Filed Oct. 24, 1935
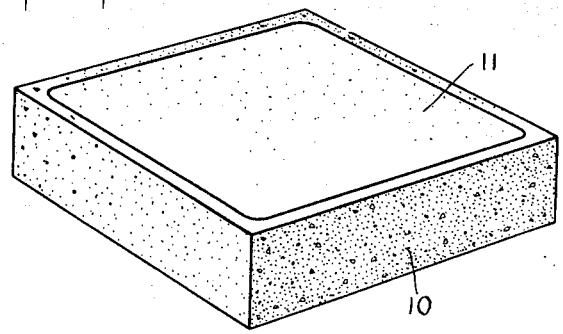
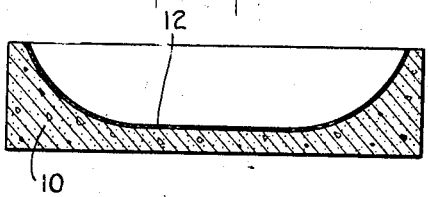
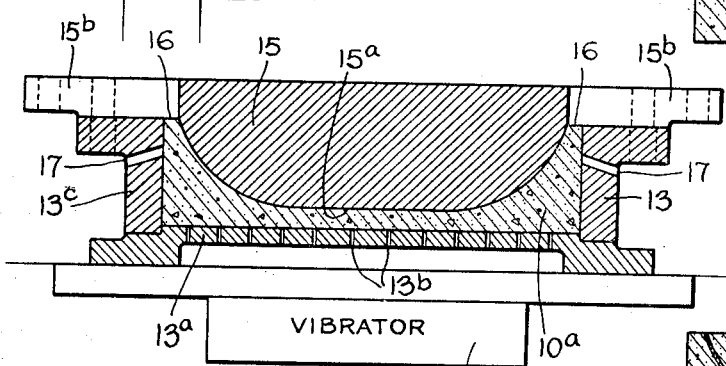
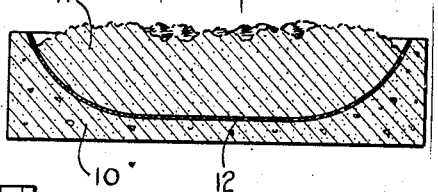
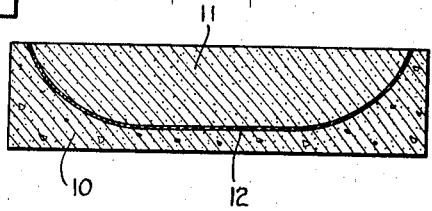
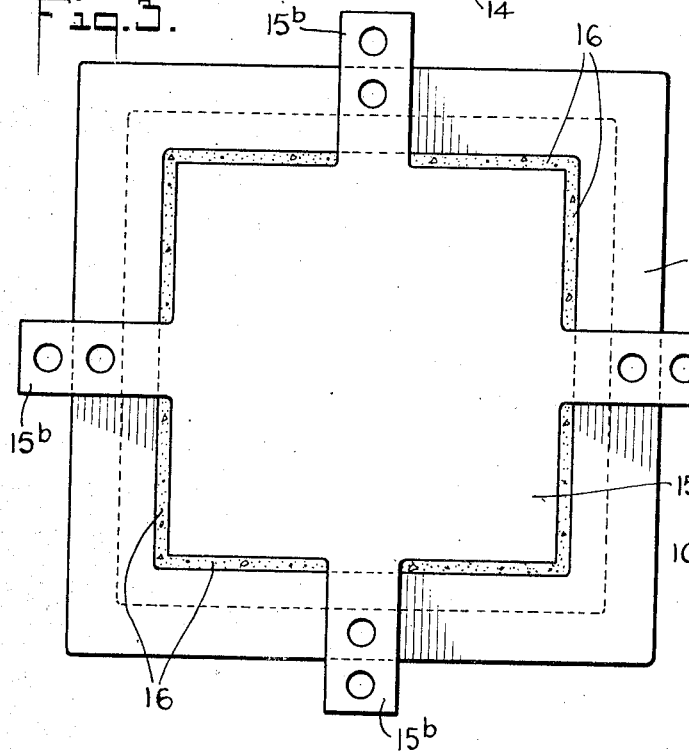
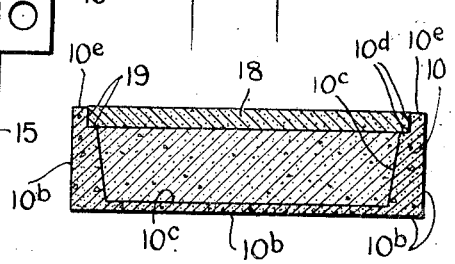
INVENTOR
William E. S. Strong
BY
Henry J. Lucke
HIS ATTORNEY Patented Aug. 22, 1939

2,170,165

UNITED STATES PATENT OFFICE 2,170,165

COMPOSITE BUILDING UNIT

William E. S. Strong, New York, N. Y., assignor to John B. Pierce Foundation, New York, N. Y., a corporation of New York Application October 24, 1935, Serial No. 46,454

9 Claims. (Cl. 72—36)

My invention relates to improved structural units of concrete or of cementitious materials of the nature of concrete.

The invention relates particularly to structural units of a composite nature embodying concrete, or other cementitious material of the nature of concrete, for structural strength, and embodying insulating material for imparting desired insulating characteristics.

A primary object of the invention is the provision of a concrete structural unit having, per se, insulating characteristics to a high degree.

An object is the provision of a concrete structural unit of unusually light weight yet having considerable structural strength.

An object is the provision for attaining a molded concrete element having density and strength greater than ordinary tamped concrete.

Pursuant to my invention, a concrete element having improved characteristics is had by subjecting a mass of plastic concrete to vibration, and simultaneously therewith to compression. Such treatment imparts desirable properties to the resulting element, and produces a finish on all faces of the element as well as a greater faithfulness of transfer of the configurations of the mold faces. The resulting concrete element is highly resistant to water and moisture, and possesses compressive strength, resistance against rupture by bending, and resistance against permeation by wind, such properties being highly advantageous in the use as a component element of a structural unit.

The concrete element, as a component of the composite structural unit of the invention, is recessed, forming a shell for the reception of a mass of material of less weight and advantageously of heat and sound insulating qualities. The stated mass of material may be of porous character, such as a light weight product resulting from a suitable mixture with water, of ground silica, and/or other siliceous material, and lime, and/or other calcareous elements, usually indurated by heat treatment; or it may be individual elements, such as particles or fibers bonded together to form a solid element for fitting into the recess of the concrete shell; or it may be composed of individual elements such as small particles or fibers loosely associated. In the latter case, a cover plate or other suitable element or means may be employed to retain the loose insulating material in place within the recess of the concrete shell.

The concrete element or shell is particularly adapted for forming the exterior face of a wall or other structure of a building for exposure to and resistance against all kinds of weather conditions.

The uniting of concrete and insulating elements may be carried out in any desirable manner, preferably by a bonding medium of water resistant character interposed between the two elements.

Further features and objects of the invention will be more fully understood from the following detail description and the accompanying drawing, in which Fig. 1 is a perspective view of a preferred form of building unit embodying an outer element of vibrated and compressed concrete and a therewith unitarily combined inner element of lesser density.

Fig. 2 is a vertical sectional view of a mold charged with a cementitious mixture subjected to vibration under pressure.

Fig. 3 is a top plan view of Fig. 2.

Fig. 4 is a vertical section of the compressed cementitious structural element resulting from the steps of Figs. 2 and 3, a portion of the inner surface of said element additionally having a bonding medium applied thereto.

Fig. 5 is a transverse sectional view of an element of vibrated and compressed cementitious mixture, and a charge of mixture of lesser density disposed in a hollow cavity of the cementitious element.

Fig. 6 is a transverse sectional view of the product resulting from the step indicated in Fig. 5.

Fig. 7 is a transverse sectional view of another embodiment of my invention.

Referring to that preferred form of my product which is illustrated in Figs. 1 and 6, the element or shell 10 of concrete or other cementitious material is illustrated as an "outer" element and the material 11, of lesser density, as an "inner" element, the elements 10 and 11, being unitarily assembled as a building block, slab, or other structural unit.

The "outer" element 10 of concrete or other cementitious material is preferably the product resulting from subjecting a quantity of concrete or the like to combined pressure and vibration within the confines of a mold to impart the desired outer configuration and to also provide such element with a cavity of any suitable form for receiving and retaining therein the desired mass of lesser density with which the cementitious element is to be combined as a unit for use in the erection of an outer, inner and/or intermediate wall, partition, floor, roof, or the like.

Such "inner" material 11 may possess such characteristics, in addition to that of lesser weight, as may be desired. Advantageously, such "inner" material 11, for use as a building unit, such as a component of an outer, inner, and/or intermediate wall, possesses the attribute of sound insulation. Such "inner" material 11 may possess per se the property of adhering to and/or with the faces of the recess or recesses of the "outer" material 10, as by chemical and/or tentacle adherence or the like. In such instances where chemical and/or tentacle adherence does not arise, or is sought to be enhanced, a suitable bonding medium 12 may be interposed.

In Figs. 2 and 3, I have indicated the step of subjecting a mass of concrete or other cementitious admixture 10a to vibration and compression. 13 represents any suitable form and type of mold, suitably contoured at its effective faces corresponding to the desired contours of the resulting cementitious "outer" element 10. Advantageously, the bottom mold element 13a, which may be of cast metal, is provided with minute openings 13b for the discharge of air ensuing during the stage of subjection to vibration, indicated by the vibrator 14, and to compression indicated by the weight 15. Provision for the discharge of excess moisture is had by the clearance, see 16, Figs. 2 and 3, between the lateral faces of the weight 15 and the inner lateral faces of the mold and/or by suitable openings, see 17, Fig. 2, in the mold. The mold 13 is preferably of disassembling character, that is to say, the side frame 13c, as a whole or by component parts, is separable from the bottom 13a. The weight 15 is suitably dimensioned and is of suitable mass to produce momentum during the stage of vibration, for effecting a desired degree of density of the resulting product, i. e., the "outer" element 10. The effective face 15a of the weight 15, is suitably dimensioned and contoured to effect finish and the desired dimension and contour of the recessed faces of the resulting product.

The recess of the resulting product is preferably downwardly and inwardly tapered to provide for adequate strength of the side walls of the unit at their intersection with the bottom wall thereof.

Upon completion of the "outer" element 10, see Fig. 4, the same is treated for the completion of the desired structural unit, as above indicated. Assuming the employment of a bonding medium 12, the faces, in whole or in part of the recess of the "outer" element 10 are coated with such bonding medium 12, whereafter, an admixture, 11a, see Fig. 5, of the "inner" material is charged into such recess or recesses. After leveling to remove the excess of such admixture 11a, see Fig. 6, and upon maturing of the "inner" element 11, also that of the bonding medium 12, if employed, there results the building or other unit of the type indicated in Figs. 1 and 6.

Other form and types of structural units of unitary assembly comprising "outer" and "inner" elements as aforesaid may be produced in a similar manner.

As a suitable cementitious mixture in carrying out my invention, I cite Portland, hydraulic or other cement.

As a type of flocculent material, I cite vermiculite which is rendered flocculent by heat treatment and adapted to form a mass of lesser unit weight by bonding with a suitable bonding medium such as Portland, hydraulic or other cement.

By reason of the common cementitious component of such "outer" and "inner" elements, the same may be united by direct contact, with or without vibration and/or compression.

Pursuant to the above stated principles of my invention, the simultaneous subjection to vibration and compression affords the combinational effect of expelling excess water and other moisture content, densifying the resulting cementitious product to the desired extent and accurately and uniformly attaining the desired wall thicknesses, inclusive of any horizontal and/or vertically upward movement of the treated mass in the attainment of any desired configuration, any desired dimensional outline and all variant wall thicknesses and contours. In such action there is effective upon the plastic mass the combinational stresses afforded by the weight and the vibration momentum of the mass of the weight.

Desirably, as is indicated in the drawing the compressing weight, such as the illustrated weight 15, is provided with suitable means for limiting its downward movement and amplitude of its momentum oscillations, such means being indicated by the arms 15b, arranged to finally rest upon the upper face of the lateral mold walls 13a or other suitable stop.

It will be understood that the total mass and final wall thicknesses and configuration of the unit are selected, with the proper factor of safety, to afford the desired load bearing attributes and desired density to preclude or retard permeation of water, moisture and the like; also to preclude or retard permeation of air induced by wind and other pressure. Further, the dimensions and configurations of the combined "outer" and "inner" elements may be selected in correspondence to the desired dimensions of the wall or other structural part of which my combined building unit is adopted to form a component. The character of the bonding material is selected with reference to the above stated characteristics of the combined vibrated and compressed cementitious element and also those of the lesser weight element, to attain the desired combinational characteristics of the stated constituents. Tar, asphalt or like water and moisture-resistant materials serve advantageously as the bonding medium by reason of their low cost and their capability of being readily sprayed in all directions to form a layer of substantially uniform thickness.

Fig. 7 illustrates another embodiment of my invention, wherein loose insulating material is confined within the recess of the concrete element by a cover plate of any suitable material. In the particular form illustrated 10 represents the concrete "outer" element, molded in dimensions, contour and finish at its outer faces 10b, 10e and at its recess faces 10c, and preferably molded also, as at 10d, to produce a counter-recess for receiving a slab or cover plate 18, which slab may be of bonded insulating material, similar to that of the "inner" element 11, or of concrete similar to that of the "outer" element 10 above stated material serving as the inner element, i. e., "inner" element 15. Between the slab 18 and the faces of the recess of the outer element 10 is a quantity of flocculent material of low heat conductivity, and preferably of low sound conductivity such as heat expanded vermiculite, cork particles, glass wool, etc., the slab 18 being secured to the "outer" element 10 in any suitable manner, as by asphalt, tar or the like, or by any suitable mechanical means, indicated at 19.

Embodiments of my invention of the "outer" element have been obtained under commercial conditions by subjecting the cementitious mixture under compression of the magnitude of four pounds per square inch, simultaneous with vibration; the compression strength of the resulting product represents an increase of the order of 38% as compared with the same cementitious mixture subjected to vibration in the absence of compression. The compression strength of my stated product represents an increase of the order of 88% as compared with the same cementitious mixture tamped pursuant to accepted present day practice, that is to say, without vibration and without subjection to compression. The particular cemetitious mixture employed in the comparative tests consisted of one part of cement to three parts of sand by weight, and the proportion of 44% by weight of water.

From the above, it appears that by my combinational treatment of concrete and materials of the nature of concrete jointly to compression and vibration, all peripheral faces of the resulting molded product are per se finished.

The proportions of cement mixture and expanded vermiculite for the production of the "inner" element may be selected as preferred. An admixture of two parts by weight of cement mixture to one part by weight of expanded vermiculite yields a product possessing the above stated attributes pursuant to my invention to a highly satisfactory degree, particularly its immunity from fracture. By reducing the proportion of cement mixture relative to that of expanded vermiculite the unit weight of the resulting product is reduced and its heat and sound insulation characteristics increased.

In lieu of a weight, compressional force may be exerted upon the cementitious mass by other suitable form of mechanical pressure.

Whereas I have described my invention by reference to specific forms thereof, it will be understood that many changes and modifications may be made without departing from the spirit of the invention.

I claim:

1. A building unit comprising a concrete block having a substantially retangular configuration with two major faces spaced apart oppositely by the thickness of the block, and a recess opening over the greater portion of one of the said major faces and tapering inward toward the opposite major face throughout the greater portion of the thickness of the block; loose insulating material filling the said recess in the block, and a plate disposed over the said recess and secured to the block.

2. A building unit comprising a concrete block having a substantially rectangular configuration with two major faces spaced apart oppositely by the thickness of the block, and a recess opening over the greater portion of the thickness of the block, the said recess being enlarged at its opening to provide a marginal recess; loose insulating material filling the said recess to the level of the marginal recess; and a plate covering the opening of said recess, and fitting into, and bonded with the walls of, said marginal recess.

3. A building unit comprising a concrete element molded under conditions of simultaneous vibration and compression to produce concrete density and strength considerably greater than ordinary concrete, said concrete element being recessed to form a shell, and insulating material secured within and substantially filling the recess of said concrete shell.

4. A building unit comprising a concrete element molded under conditions of simultaneous vibration and compression to produce concrete density and strength considerably greater than ordinary concrete, said concrete element being recessed to form a shell, and a solid insulating element secured within and substantially filling the recess of said concrete shell.

5. A building unit comprising a concrete element molded under conditions of simultaneous vibration and compression to produce concrete density and strength considerably greater than ordinary concrete, said concrete element being recessed to form a shell, and a solid insulating element bonded within the recess of said concrete shell by a water resistant bonding medium, said insulating element substantially filling the recess of said concrete shell.

6. A building unit comprising a concrete element molded under conditions of simultaneous vibration and compression to produce concrete density and strength considerably greater than ordinary concrete, said concrete element being recessed to form a shell, and insulating material comprising loosely associated individual elements confined within and substantially filling the recess of said concrete shell.

7. A building unit comprising a concrete element molded under conditions of simultaneous vibration and compression to produce concrete density and strength considerably greater than ordinary concrete, said concrete element being recessed to form a shell, insulating material comprising loosely associated individual elements disposed within and substantially filling the recess of said concrete shell, and a solid cover element secured to said concrete shell across the opening of the recess therein confining said insulating material within said concrete shell.

8. A building unit comprising a concrete block having a substantially rectangular configuration with two major faces spaced apart oppositely by the thickness of the block, and a recess opening over the greater portion of one of the said major faces and tapering inward toward the opposite major face throughout the greater portion of the thickness of the block, said concrete block being molded under conditions of simultaneous vibration and compression to produce concrete density and strength considerably greater than ordinary concrete; loose insulating material filling the said recess in the block; and a plate disposed over the said recess and secured to the block.

9. A building unit comprising a concrete block having a substantially rectangular configuration with two major faces spaced apart oppositely by the thickness of the block, and a recess opening over the greater portion of the thickness of the block, the said recess being enlarged at its opening to provide a marginal recess, said concrete block being molded under conditions of simultaneous vibration and compression to produce concrete density and strength considerably greater than ordinary concrete; loose insulating material filling the said recess to the level of the marginal recess; and a plate covering the opening of said recess, and fitting into, and bonded with the walls of, said marginal recess.

WILLIAM E. S. STRONG.